United States Patent [19]
Dreeben

[11] 3,724,287
[45] Apr. 3, 1973

[54] THROTTLE CONTROL APPARATUS

[76] Inventor: Jack Dreeben, Northgate Apartments, Apt. 2N, Camden, N.J. 08102

[22] Filed: Aug. 13, 1971

[21] Appl. No.: 171,486

[52] U.S. Cl. ..........................74/526, 74/513, 123/98
[51] Int. Cl. ...............................................G05g 5/04
[58] Field of Search.....................74/526, 513, 565; 123/98, 103 C, 103 E

[56] References Cited

UNITED STATES PATENTS

| 3,543,601 | 12/1970 | Berger | 74/513 |
| 3,000,475 | 9/1961 | Arpin | 74/513 X |

*Primary Examiner*—Charles J. Myhre
*Assistant Examiner*—F. D. Shoemaker
*Attorney*—Paul Maleson

[57] ABSTRACT

An apparatus for aiding the operator of a vehicle in controlling a throttle mechanism. The apparatus includes a moveable member which is longitudinally adjustable. A spring is rigidly secured to the moveable member at a lower end. A chain is attached on opposing ends to the spring and an accelerator pedal respectively. Adjustment of the moveable member in a downward direction permits the chain to remain in a slackened position until the accelerator pedal is displaced a sufficient distance to cause the chain to become taut. Increased displacement of the accelerator pedal is then accomplished through extension of the spring which increases the normal pedal resistance force. The operator may override the increased resistance force but is made aware of the increase in vehicle speed.

14 Claims, 4 Drawing Figures

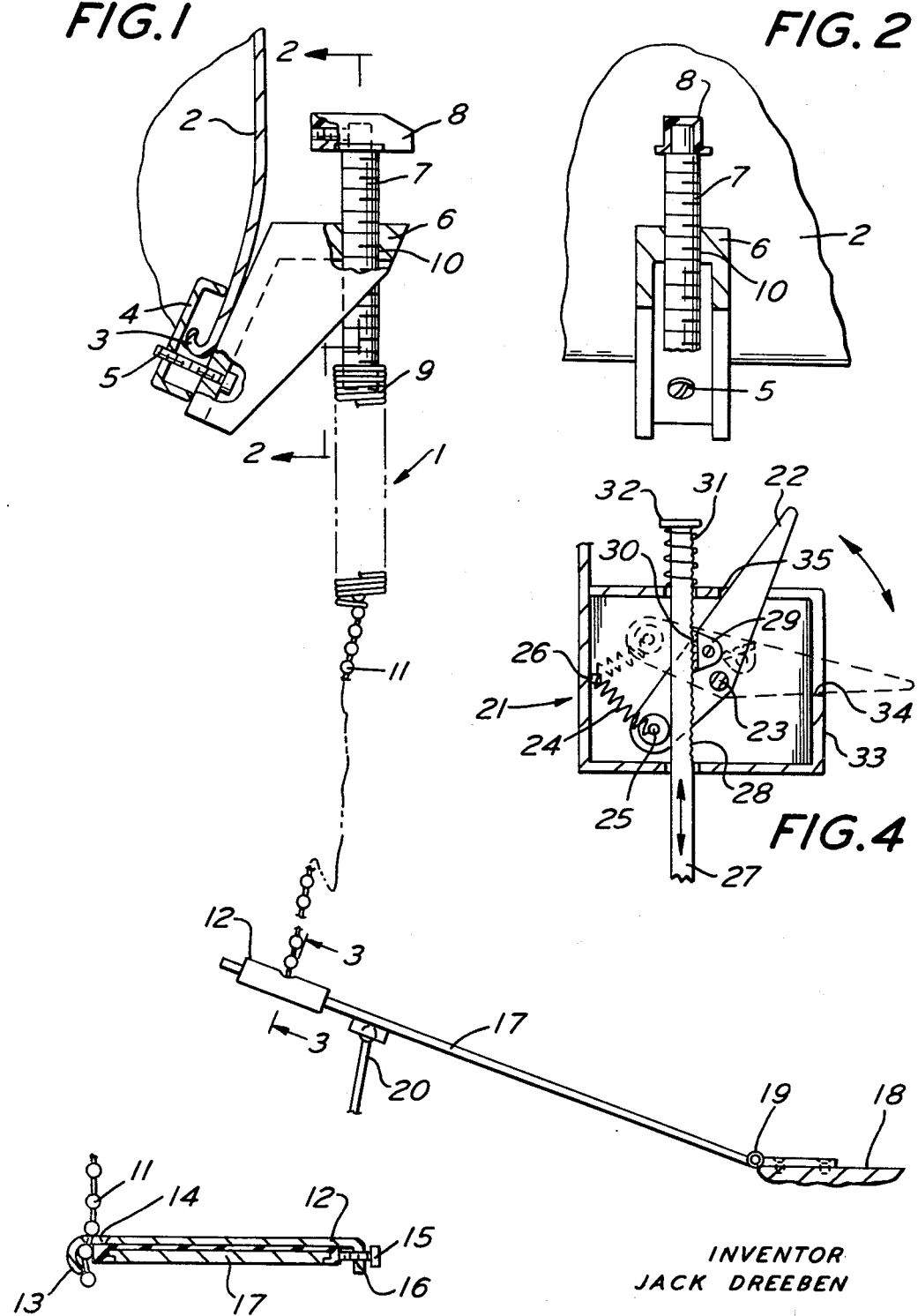

THROTTLE CONTROL APPARATUS

BACKGROUND OF THE INVENTION

1. Field of the Invention

This invention relates to the field of vehicle throttle control mechanisms. In particular this invention pertains to the field of controlling the displacement of a vehicular accelerator pedal. More in particular, this invention relates to the field of regulating an accelerator pedal displacement force resistance when a depression force is applied to the accelerator pedal.

2. Description of the Prior Art

Throttle control mechanisms for vehicle speed control are known in the art. Some of the prior mechanisms disclose a direct linkage from the dashboard to the accelerator pedal. However, these mechanisms provide for rigid link connections and set the vehicle speed as a function of accelerator pedal displacement with no operator means for overriding the system manually to increase the speed of the vehicle when necessary. Other prior mechanisms include linkages which extend between the vehicle floorboard and accelerator pedal to hold the accelerator pedal at some depressed point. In addition to the increased installation costs of such mechanisms, they do not provide the operator control achieved by the present invention where an intermediate resistance point is placed in the depression arc of the accelerator pedal.

Some of the prior mechanisms provide basic rod extensions which are settable at varying lengths to press down on the accelerator pedal and hold it in a fixed position. Such mechanisms although allowing manual override to permit increased depression of the pedal do not provide for pedal retraction when an operator takes his foot from the pedal. In such mechanisms the operator must specifically release the mechanism in order to terminate the set point.

SUMMARY OF THE INVENTION

An object of the instant invention is to provide a vehicle throttle control mechanism which can be manually adjusted by an operator.

Another object of this invention is to provide a throttle control mechanism which may be easily installed in vehicles and is low in cost to manufacture.

A still further object of the subject invention is to provide a mechanism which is attached to the accelerator pedal of a vehicle and causes an increased pedal resistive force when the pedal is depressed through a predetermined displacement.

A throttle control apparatus to increase an accelerator pedal resistance force when the accelerator pedal has been depressed through a predetermined displacement. The apparatus includes an adjustment mechanism for engaging the throttle control apparatus when the accelerator pedal is displaced from an initial position to a predetermined engaging position. When the accelerator pedal has been displaced to the engaging position a spring increases the accelerator pedal force resistance. Accelerator pedal connection means are secured on opposing ends thereof to the spring and the accelerator pedal respectively.

DESCRIPTION OF THE PREFERRED EMBODIMENTS

BRIEF DESCRIPTION OF THE DRAWINGS

FIG. 1 is an elevational view partially in cross-section of the throttle control apparatus including mounts to a fixed frame and an accelerator pedal;

FIG. 2 is a sectional view of the throttle control apparatus taken along the section line 2—2 of FIG. 1;

FIG. 3 is a cross-sectional view of the accelerator pedal showing the apparatus pedal attachment fixed thereto and taken along the section line 3—3 of FIG. 1; and, FIG. 4 is an elevational cross-section of an embodiment of the invention showing an alternate accelerator pedal adjustment mechanism.

DESCRIPTION OF THE APPARATUS

Referring now to FIGS. 1, 2 and 3, there is shown throttle or accelerator control apparatus 1 for providing an increased resistance force in displacing accelerator pedal 17 an amount greater than that set by an operator. Apparatus 1 is utilized to regulate the displacement force resistances on pedal 17 when a depression force is so applied. In general, accelerator pedal 17 is secured to vehicle floorboard 18 to permit relative rotational displacement about pivot hinge 19 as shown. Pedal rod 20 generally passes through vehicle floorboard 18 and is pivotally attached to a lower surface of pedal 17. Pedal 17 is normally maintained in an upwardly displaced position through action of a spring loading mechanism acting through rod 20. Depression of pedal 17 in an arcuate downward direction generally moves a throttle control which in turn causes increased speed of the vehicle.

The invention as herein described provides for adjustment mechanisms to allow engagement of apparatus 1 after pedal 17 has been displaced from an initial unloaded upward position to a predetermined engaging position. The engaging position of pedal 17 is determined by the operator of the vehicle dependent upon the vehicle speed he wishes to maintain. As accelerator pedal 17 is moved in the downwardly directed direction, the vehicle increases speed and as the vehicle reaches the prechosen velocity, the operator feels a definite resistive force to his attempts to further displace pedal 17. The operator may override apparatus 1 by increasing the depression force, but he is made aware of the fact that he has passed his pre-set speed limitations.

Adjustment of the depression displacement for pedal 17 is maintained through moveable member or bolt 7 which threadedly engages frame attachment 6 as is shown in FIG. 1. Bolt 7 passes through threaded opening 10 within an upper horizontal wall of attachment 6 and extends downwardly. Housing or frame attachment 6 is additionally secured to fixed frame or dashboard 2 through mechanical attachments which may be easily affixed. The basic mode of securement of housing 6 to dashboard 2 is shown clearly in FIG. 1 wherein frame attachment bolt 5 thready passes through a sidewall of housing 6 into clamp member 4. Clamping member 4 is substantially U-shaped in cross-section having opposing end legs contacting the inner surface of fixed frame 2 and the sidewall of frame 6 respectively. The particular shape of connecting clamp 4 permits relief from dashboard extension 3 commonly found in vehicles. Application of a torque to attachment bolt 5 therefore causes the legs of clamp 4 to rigidly contact dashboard 2 and frame 6 thereby securing frame 6 to a rigid member. In general, frame attachment member 6 is positioned substantially vertical to accelerator pedal 17 although such not being necessary to the invention as herein described.

Rotational movement of bolt 7 within threaded opening 10 of frame 6 provides for substantially linear displacement in a vertical direction and positionally aligns member 7 in the vertical direction. Knob 8 is rigidly secured to member 7 on an uppermost end thereof in order to provide manual rotation capability for an operator. Therefore, using standard right hand designations a clockwise rotation of knob 8 causes generally downward movement of bolt 7 which as will be shown, allows a greater arcuate displacement of pedal 17 before actuation of apparatus 1.

On the lowermost end of bolt 7, there is rigidly attached thereto, spring or resilient member 9 passing in a downward direction as is shown. Spring 9 provides the means for increasing the accelerator pedal force resistance after pedal 17 has been displaced to the throttle control engaging position. As accelerator pedal 17 is depressed, flexible member 11 becomes taut with respect to resilient member 9 which forces a tensile loading therein. Increased depression of pedal 17 forces extension of element 9 but such entails a greater force application by the operator. Spring 9 is rigidly secured to bolt 7 through either force fit, welding, or some like means not important to the inventive concept. Additionally, spring element 9 may be helically wound and constructed of steel or some like material structurally sufficient to withstand the tensile loads. In general, flexible member 9 may be constructed of a wide variety of materials in a similar wide variety of shapes as long as they are resilient to the forces imposed. With respect to this, member 9 may be constructed of a rubber material in the shape of an elongated beam member.

Spring member 9 is connected to accelerator pedal 17 through flexible member or chain 11 which in turn is fastened to pedal attachment 12 as shown. Flexible member 11 is secured to a lower end of member 9 in a manner such that there is no respective movement longitudinally but there is freedom of motion in a transverse plane. In addition, member 11 may be a ball chain as shown, wherein the individual links are spherical in shape and are connected by shortened rod members which allow longitudinal and transverse movement between consecutive links. Member 11 may be constructed of steel or some like material sufficient in strength to accept the stress loading.

Pedal attachment 12 may be formed in a general U-shape cross-section as shown in FIG. 3. Element 12 may be slideably mounted on accelerator pedal 17 conveniently located forward pedal rod 20 as shown in FIG. 1. Set screw 15, threadedly engages opening 16 on a lateral wall of attachment 12 and is utilized for fixedly securing element 12 to pedal 17 after slideable engagement has been made. As will be shown, set screw 15 also plays a commanding role in the attachment of member 11 to element 12. Chain 11 passes through attachment opening 14 which is vertically directed through an upper wall of member 12 on an opposing transverse side with respect to set screw member 15. Opening 14 may have a varying diameter ranging in size at one end from a diameter greater than the individual ball links to a diameter at an opposing end less than the ball links. In operation, the ball chain is therefore passed through opening 14 and member 12 is slideably engaged with pedal 17. Set screw 15 engages pedal 17 forcing element 11 to be wedged between opposing pedal attachment wall 13 and pedal 17 as shown in FIG. 3. In addition, ball chain 11 is forced into the area of opening 14 where the individual ball diameters exceed the opening diameter and member 11 is still further locked to pedal 17. In this manner, there is formed a connection mechanism from accelerator pedal 17 directly to bolt or moveable member 7 which is then rotationally adjusted by knob 8 as previously described.

As shown, knob 8 may be rotated to achieve a predetermined longitudinal movement of moveable member 7 which correlates to a specifically predetermined vehicle speed. When accelerator pedal 17 is in its uppermost position, member 11 is in a slackened position with respect to members 11 and 17. As pedal 17 displacement is increased to the predetermined speed designation, chain 11 becomes taut. Once member 11 is taut, the throttle apparatus engaging position has been reached and increased depression force provides extension of spring 9 which increases the overall force resistance of pedal 17 which the operator must overcome. The increased resistance then provides the operator with knowledge that he has exceeded the set vehicle speed.

An embodiment of the subject invention is shown in FIG. 4 wherein housing 21 is rigidly secured to fixed frame 2 in a manner not important to the inventive concept herein described. Rigid rod member 27 passes vertically through housing 21 and is interfaced on an opposing end (not shown) to spring 9 as shown in FIG. 1. In an unloaded configuration, rod 27 is maintained in an upwardly directed position through rod spring 31 which is compressively stressed between an upper wall of housing 21 and shoulder 32 of rod 27. In operation, the operator depresses accelerator pedal 17 until the desired vehicle speed is reached, and as is evident, flexible member 11 pulls spring 9 and consequently rod 27 is pushed in a downwardly directed displacement. Latch rod 22 is then brought into an uppermost position as shown by the solid line designation in FIG. 4 in order to lock rod member 27 and define the apparatus engaging position.

Ratchet teeth 30 are formed within rod 27 as shown, which engage mating ratchet teeth formed on lock ratchet member 29 which is rigidly fastened to latch rod 22. Latch rod 22 may be rotated about pivot joint 23 through a passage formed in wall 33 of housing 21. In addition, spring 24 provides a quick release of latch rod 22 through forces transmitted thereto by means of connection to housing wall member 26 and latch spring attachment 25 on rod 22.

For ease of manual operation, latch rod 22 passes external to housing 21 through the aforementioned passage formed in wall 33. The passage permits translation of latch rod 22 from first or locked position 35 to second or unlocked position 34. The extension of rod 22 through wall 33 permits the operator to lock rod 27 in positional restraint as well as provide a quick release mechanism wherein rod 27 is directed in an upward direction as a function of the actuating force from spring 31.

In order to determine the apparatus engaging position, the operator depresses pedal 17 until the appropriate vehicle speed is reached. Rod member 27 has now been downwardly displaced, and this position determines apparatus 1 engaging displacement of pedal 17. Latch rod 22 is forced from second position 34 to operating position 35 as shown. Mating teeth on lock ratchet 29 and rod member 27 are forced into engagement and hold rod member 27 in a predetermined displacement position. Release of latch rod 22 into second position 34 provides instant release of rod member 27 which is forced upward through action of rod spring 31.

In the scope of the work undertaken in the field of throttle control mechanisms, the invention as has been detailed herein, provides a low cost, easily adjustable and highly efficient means for providing operator control of an accelerator pedal. A number of modifications and variations of the present invention as hereinbefore set forth may be made without departing from the spirit and skill thereof, and therefore only such limitations should be imposed as are indicated by the appended claims.

What is claimed is:

1. A throttle control apparatus to increase an accelerator pedal resistance force when said accelerator pedal has been depressed through a predetermined displacement, comprising:
   a. adjustment means for engaging said throttle control apparatus when said accelerator pedal is displaced from an initial position to a predetermined engaging position, said adjustment means including frame attachment means for securing said adjustment means to a frame member fixedly positioned with respect to said displaced accelerator pedal, said adjustment means further including a movable member translatable with respect to said frame attachment means, said movable member threadedly engaging said frame attachment means and providing relative linear motion between said movable member and said frame attachment means when said movable member is rotated;
   b. means for increasing said pedal resistance force when said accelerator pedal has been displaced to said engaging position; and,
   c. accelerator pedal connection means secured on opposing ends thereof to said force resistance increasing means and said accelerator pedal.

2. The apparatus as recited in claim 1 wherein said rotation of said moveable member forces a substantially vertical translation of said member with respect to said accelerator pedal.

3. The apparatus as recited in claim 1 wherein said accelerator pedal connection means includes:
   a. an elongated flexible member moveably secured to said pedal force resistance means; and,
   b. pedal attachment means secured to said elongated flexible member and said accelerator pedal.

4. The apparatus as recited in claim 3 wherein said flexible member is force loaded when said accelerator pedal is displaced to said predetermined engaging position.

5. The apparatus as recited in claim 4 wherein said flexible member comprises a chain linkage.

6. The apparatus as recited in claim 5 wherein said chain linkage comprises a plurality of slideably connected spherical links.

7. The apparatus as recited in claim 3 wherein said pedal attachment means includes:
   a. a collar for slideably engaging said accelerator pedal;
   b. means for securing said flexible member to said collar; and,
   c. collar fastening means for fastening said collar to said accelerator pedal.

8. The apparatus as recited in claim 7 wherein said collar fastening means includes a set screw for threadedly engaging said collar, said set screw frictionally contacting said accelerator pedal in a transverse direction to fasten said collar to said pedal.

9. The apparatus as recited in claim 8 wherein said flexible member securement means includes a variable diameter opening through said collar, said flexible member passing through said opening.

10. The apparatus as recited in claim 9 wherein said flexible member is gripped between said collar and said pedal when said set screw engages said pedal.

11. The apparatus as recited in claim 1 wherein said adjustment means includes:
   a. an elongated rod member being positionally moveable in a substantially vertical direction, said rod member having gear teeth formed on a peripheral wall thereof; and,
   b. latch means for contacting said rod member on said peripheral wall to provide locking of said rod member at a predetermined position in said vertical direction.

12. The apparatus as recited in claim 11 wherein said adjustment means includes a helical spring surrounding said rod member throughout a portion of said rod member elongation, said spring for creating an upward force on said rod through compressive force loading of said spring between said rod and a fixed frame.

13. The apparatus as recited in claim 12 wherein said latch means includes a latch rod having ratchet teeth formed thereon for interface with said rod member teeth.

14. The apparatus as recited in claim 13 wherein said latch means includes a spring release member for removing contact between said latch rod and said rod member, said spring release member being connected on opposing ends thereof to said latch rod and said fixed frame.

* * * * *